(12) United States Patent
Gävert et al.

(10) Patent No.: US 10,355,885 B2
(45) Date of Patent: Jul. 16, 2019

(54) ADJACENT CHANNEL INTERFERENCE PROTECTION

(71) Applicant: TELEFONAKTIEBOLAGET LM ERICSSON (PUBL), Stockholm (SE)

(72) Inventors: Björn Gävert, Göteborg (SE); Göran Nilsson, Hisings Backa (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/035,645

(22) PCT Filed: Nov. 12, 2013

(86) PCT No.: PCT/EP2013/073627
§ 371 (c)(1),
(2) Date: May 10, 2016

(87) PCT Pub. No.: WO2015/070896
PCT Pub. Date: May 21, 2015

(65) Prior Publication Data
US 2016/0285654 A1 Sep. 29, 2016

(51) Int. Cl.
*H04B 1/38* (2015.01)
*H04L 5/16* (2006.01)
*H04L 25/03* (2006.01)
*H04L 1/00* (2006.01)
*H04B 17/336* (2015.01)
*H04B 17/354* (2015.01)
(Continued)

(52) U.S. Cl.
CPC .............. *H04L 25/03* (2013.01); *H04B 15/00* (2013.01); *H04B 17/336* (2015.01); *H04B 17/354* (2015.01); *H04L 1/0002* (2013.01); *H04L 1/0023* (2013.01); *H04L 5/0062* (2013.01); *H04B 1/1027* (2013.01); *H04B 17/318* (2015.01); *H04B 17/345* (2015.01); *H04L 1/0025* (2013.01); *H04W 28/22* (2013.01); *Y02D 50/10* (2018.01)

(58) Field of Classification Search
CPC ......... H04L 25/03; H04L 1/0002; H04L 1/20; H04L 5/0062; H04B 1/1027; H04B 17/336; H04B 17/345; H04B 17/354; H04B 17/318; H04B 15/00; H04W 28/22; H04W 24/10; Y02B 60/31; H01Q 1/34; Y02D 50/10
USPC .......................... 375/219, 220, 222, 227, 257
See application file for complete search history.

(56) References Cited

U.S. PATENT DOCUMENTS 6,304,594 B1 * 10/2001 Salinger ............... H04B 1/1027
375/222
8,767,865 B2 * 7/2014 Muraoka ............... H04W 24/10
375/224

(Continued)

FOREIGN PATENT DOCUMENTS

EP 2 557 706 A1 2/2013

*Primary Examiner* — Phuong Phu (57) ABSTRACT

A method in a fixed point-to-point radio link transceiver, the method comprising the steps of receiving a first signal from a far end transceiver in a first frequency band, and detecting the presence of interference in the received first signal, as well as transmitting a second signal to the far end transceiver. The step of transmitting comprising including, in the second signal, a request to reduce transmission symbol rate in the far end transmitter when interference is detected in the received first signal.

15 Claims, 6 Drawing Sheets

(51) Int. Cl.
*H04B 15/00* (2006.01)
*H04L 5/00* (2006.01)
*H04B 1/10* (2006.01)
*H04B 17/345* (2015.01)
*H04B 17/318* (2015.01)
*H04W 28/22* (2009.01)

(56) References Cited

U.S. PATENT DOCUMENTS

2002/0021692 A1 2/2002 Huh et al.
2008/0057869 A1 3/2008 Strong et al.
2008/0273622 A1* 11/2008 Bergholm ................. H04L 1/20
375/285
2014/0086191 A1* 3/2014 Berntsen ................... H01Q 1/34
370/329

* cited by examiner

ADJACENT CHANNEL INTERFERENCE PROTECTION

TECHNICAL FIELD

The present disclosure relates to a transceiver, a radio link, and a method for point-to-point radio communication.

BACKGROUND

A fixed point-to-point radio link is a two-way communication system designed for communication between two fixed locations, each location comprising at least a transmitter unit and receiver unit, i.e., a transceiver. The transceiver is often equipped with, or connectable to, at least one highly directive antenna.

Fixed point-to-point radio links are commonly deployed in networks used for cellular backhaul, and are therefore often subject to strict requirements on performance, e.g., in terms of allowed bit error rate and link availability. Such requirements are, e.g., defined by standardization organizations such as the European Telecommunications Standards Institute, ETSI, and the American National Standards Institute, ANSI.

Common requirements on radio link availability are on the order of 99.99% to 99.999%, meaning that the radio link cannot be down for more than 0.01% to 0.001% of the year. The requirement on bit error rate, BER, is often on the order of 10^-11. This complicates the design of transceivers for fixed point-to-point radio links and drives cost compared to, e.g., design of transceivers used for cellular access, which are often associated with less strict requirements on availability and bit error rates. It is always desirable to keep requirements as low as possible since strict requirements often drive complexity and cost.

The distance in frequency between frequency channels in a radio link network, i.e., how closely adjacent frequency channels are allocated in the network, is to a large extent determined by the carrier to interference, C/I, requirement of the communication system deployed in the network. The lower the C/I requirement, the higher the interference power which can be accommodated, and thus the more denser the frequency channels can be allocated in the network. A dense frequency channel allocation implies a higher network spectral efficiency in terms of bits/sec/Hz and is therefore highly desirable since frequency spectrum is often a scarce resource, especially in radio link networks.

The radio propagation channel over the radio link between a transmitter and a far end receiver often includes fading phenomena. This fading alters the attenuation of a transmitted radio signal compared to normal free space path loss. Fading caused by, e.g., rain and multipath propagation usually results in an increased channel attenuation. This type of fading therefore decreases the input power in a receiver, and is usually referred to as down fading.

A common practice when planning a fixed point-to-point radio link network is to allow a certain receiver threshold degradation due to interference, e.g., interference from adjacent frequency channels. So, depending on the acceptable threshold degradation a radio planner must decide if adjacent channels can be allocated relatively close in frequency or not, i.e., how high bandwidth or transmission symbol rate that the system can utilize and how much bandwidth must be allocated to guard bands. This analysis is almost always performed assuming a worst case scenario, meaning that the own link is faded down into its own noise floor. In this worst case scenario even a relatively weak interference can pose problems and cause, e.g., bit errors. This is a drawback since it generates very strict requirements on the level of interference which can be accommodated.

The performance degradation suffered from interference, e.g., adjacent channel interference, is related to a degradation of the noise floor of the communication system. However, during normal operation the radio link will not be faded and in this case the adjacent channel interferers are of insignificant relative power compared to the main communication signal. I.e. the signal to noise ratio, SNR, is good enough and the input power is high, so the noise degradation due to adjacent channels is negligible. As normal radio link network planning is based on very unlikely fading scenarios (occurring on the order of 0.01% to 0.001% of the time), the capacity penalty due to fading together with requirements on C/I becomes unreasonably large, which is a drawback.

ETSI and ANSI, both specify a transmitter spectrum mask and a receiver adjacent channel C/I requirement for radio link usage. Usually the adjacent channel C/I requirement is more stringent resulting in that the spectrum mask cannot be fully be utilized for transmission. This is a drawback since transmission symbol rate must be decreased compared to the rate allowed by the transmission mask.

SUMMARY

An object of the present disclosure is to provide a transceiver, a radio link, and a method, which seeks to mitigate, alleviate, or eliminate one or more of the above-identified deficiencies in the art and disadvantages singly or in any combination and to provide an improved adjacent channel interference protection.

This object is obtained by a method in a fixed point-to-point radio link transceiver. The method comprises the steps of receiving a first signal from a far end transceiver in a first frequency band, and detecting the presence of interference in the received first signal, as well as transmitting a second signal to the far end transceiver. The step of transmitting comprises including, in the second signal, a request to reduce transmission symbol rate in the far end transmitter when interference is detected in the received first signal.

Thus, instead of dimensioning a static network with static transmission symbol rate radio links (with static channel bandwidth) optimized, e.g., for worst case adjacent channel interference conditions, a radio link instead reduces its symbol rate only when necessary to accommodate a strong interferer, i.e., when the presence of an interference has been detected. This has the advantageous effects of lowering requirements on the level of interference in the received signal which must be accommodated by the transceiver. This is also likely to reduce requirements on transceiver hardware, again since requirements on interference resilience have been reduced.

Furthermore, according to an aspect, during normal operating conditions when interference power is low compared to the power of the received signal, the link decides whether to increase its transmission symbol rate to the transmission symbol rate allowed by the regulatory spectrum mask, which transmission symbol rate is often higher than the transmission symbol rate determined by requirements on C/I performance of a classic radio not implementing the present teaching. This is advantageous since it results in higher average capacity of the radio link due to a higher average transmission symbol rate.

Strict requirements on low bit error rate and high availability are satisfied during the occasional high interference operating condition, while at the same time a high radio link capacity is maintained during normal operating scenario with interference of less relative power. This is an advantage.

Also, since transceivers are adapting to the presence of interference by requesting reduced transmission symbol rate, a denser frequency channel allocation can be used in a network, i.e., having smaller guard bands. This is an advantage since it yields a more spectrally efficient network on average.

According to an aspect, said interference comprises interference originating from a third transmitter. The third transmitter is configured to transmit primarily in a third frequency band. The third frequency band is separated in frequency from the first frequency band.

Consequently, the third transmitter generates adjacent channel interference to the fixed point-to-point radio link.

According to another aspect, the step of detecting comprises measuring the power of the received first signal and also detecting interference in the received first signal based on if the power of the received first signal is below a pre-configured received first signal power threshold.

Consequently, in an operation scenario when the SNR and input power is high, the link is running with maximum symbol rate (and at maximum capacity). When the link experiences severe fading, which most likely gives worse relative adjacent channel interference, the link decides whether to reduce the symbol rate (and capacity) in order to protect itself from bit errors and outage.

As noted above, the interference generated by an adjacent channel transmitter only threatens receiver performance in case the received first signal is faded, i.e., comparably weak compared to the interference. Thus, a low complexity alternative to detecting interference is to assume that interference is present at all times, and simply detect interference based on received signal power. The advantage here lies in a low complexity implementation of the present teaching.

According to yet another aspect the step of detecting comprises determining a carrier-to-interference, C/I, ratio by determining the power, C, of the received first signal and also determining the power, I, of the interference originating from the third transmitter. The step of detecting further comprises comparing the determined C/I ratio to a pre-configured C/I threshold and detecting interference in the received first signal based on if the determined C/I ratio is below the pre-configured C/I threshold.

The feature of determining C/I and detecting the presence of interference in the received first signal based on the determined C/I brings the advantage of more accurate interference detection. This is because interference will only be detected when an interferer is actually present and giving rise to a non-negligible C/I degradation.

According to one aspect the method further comprises the step of equalizing the received first signal by an adaptive equalizer filter configured to minimize frequency selective fading of the received first signal. The step of detecting also comprises determining the signal attenuation by the adaptive equalizer filter around a band edge of the first frequency band, and detecting interference in the received first signal based on if the determined signal attenuation by the adaptive equalizer filter around the band edge of the first frequency band is larger than a pre-configured equalizer band edge attenuation threshold.

The feature of the adaptive equalizer, and the detecting of interference by observation of the behavior of said equalizer, is advantageous since adaptive equalizer filters are often already implemented in fixed point-to-point radio link receivers for reasons other than interference protection.

Thus an additional method of detecting interference is provided for by using an already existing equalizer unit, which is advantageous due to complexity and detection performance reasons.

According to another aspect the first frequency band comprises a first, second, and third frequency sub-band. The first frequency sub-band is located around the center frequency of the first frequency band. The second and third frequency sub-bands are located at lower and upper side-band edges, respectively, of the first frequency band. The step of detecting the presence of interference in the received first signal comprises determining a C/I ratio in the first, and in the second, as well as in the third frequency sub-band, and also detecting interference in the received first signal based on if the determined C/I ratio is larger in the second or third frequency sub-band compared to the first frequency sub-band.

The detecting of interference based on a determining of a C/I ratio in the first, and in the second, as well as in the third frequency sub-band, brings the additional advantage of knowledge about whether interference is stronger in the upper or lower side-band edge of the first frequency band. Also, since C/I ratios at side-band edges are compared to the C/I ratio around the center frequency of the first side-band, a knowledge of C/I variation over the first frequency band is obtained. As will be exemplified below, this knowledge can be exploited in countering adjacent channel interference, providing a larger degree of interference protection and/or a smaller reduction in transmission symbol rate, which is an advantage.

According to yet another aspect, the method further comprises the step of receiving, by the first signal, a request for altered transmission symbol rate from the far end transceiver.

Thus, an advantageous effect of controlling adjacent channel interference effect at the far end receiver is obtained.

According to a further aspect the method further comprises the step of receiving a request for reduced transmission symbol rate from the far end transceiver, and responding to the received request for reduced transmission symbol rate by reducing the transmission symbol rate of the transceiver by a pre-configured amount.

Thus the detrimental effects of adjacent channel interference are reduced at the far end transceiver, which is an advantage.

According to one aspect the method further comprises the step of receiving a request for increased transmission symbol rate from the far end transceiver, and responding to the received request for increased transmission symbol rate by increasing the transmission symbol rate of the transceiver by a pre-configured amount, up to a pre-configured maximum transmission symbol rate.

Thus, the advantageous effect of maintaining a high transmission symbol rate during times with less interference is obtained, which is an advantage since the spectral efficiency, in terms of bits/sec/Hz, of the fixed point-to-point radio link is increased without jeopardizing the BER performance of the radio link.

Consequently, a system utilizing the present teaching for providing improved capacity adjacent channel interference protection will maximize capacity given a standardized spectrum mask. It will not be limited by very unlikely worst case fading scenarios that have previously been known to dimension the capacity of fixed point-to-point radio links.

According to an aspect the step of detecting the presence of interference in the received first signal further comprises determining if one out of the lower sideband or the upper sideband of the first frequency band comprises a stronger interference than the other. The method further comprising the steps of requesting, via the second signal, a positive frequency offset of the first signal from the far end transmitter when interference is stronger in the lower sideband of the first frequency band compared to the upper sideband of the first frequency band. The method also comprises the step of requesting, via the second signal, a negative frequency offset of the first signal from the far end transmitter when interference is stronger in the upper sideband of the first frequency band compared to the lower sideband of the first frequency band.

By the feature of requesting a frequency offset depending on the location in frequency of the stronger out of two interference signals, the signal transmitted in the first frequency band can be shifted in frequency away from the stronger interference signal. Consequently the detrimental effects of adjacent channel interference is reduced while maintaining a high transmission symbol rate in cases with uneven interference, which is an advantage.

According to another aspect, the method further comprises receiving, by the first signal, a request for frequency offset of the second signal from the far end transceiver. The method also comprises the steps of responding by increasing the transmission center frequency of the transmitted second signal by a pre-defined amount up to a pre-configured maximum frequency offset, when the request is for a positive frequency offset, as well as responding by decreasing the transmission center frequency of the transmitted second signal by a pre-defined amount, down to a pre-configured minimum frequency offset, when the request is for a negative frequency offset.

Thus, by the shifting of transmitted frequency, the adjacent channel interference performance of the far end receiver can be improved with a minimum of reduced transmission symbol rate According to yet another aspect the method further comprises modifying the number of information bits per modulation symbol in the second signal, following a change in transmission symbol rate of the second signal, by the amount which minimizes the difference between the actual bit rate of the transmitted second signal and a pre-configured target bit-rate.

By the feature of minimizing the difference between the actual bit rate of the transmitted second signal and a pre-configured target bit-rate the advantage of minimizing changes in information bit rate due to changes in transmission symbol rate is obtained. This is especially advantageous in fixed point-to-point radio links configured for fixed bit rate transmission where a near-constant bit rate is expected.

The object of mitigating, alleviating, or eliminating one or more of the above-identified deficiencies in the art and disadvantages singly or in any combination and providing improved adjacent channel interference protection for fixed point-to-point radio links is also obtained by a transceiver for a fixed point-to-point radio link. The transceiver comprises a transmit unit arranged to transmit a second signal to a far end transceiver via a transmit port. The transceiver also comprises a receive unit arranged to receive a first signal from the far end transceiver via a receive port. The receive unit comprises an interference detection module arranged to detect the presence of interference in the first signal. The transceiver also comprises a processor unit arranged to request, via the transmitted second signal, a reduced transmission symbol rate from the far end transceiver when the interference detection module detects the presence of interference in the received first signal.

By the above disclosed transceiver the advantageous effect of reduced sensitivity to interference, in particular to adjacent channel interference, is obtained. This is mainly due to the feature of detection of interference by the interference detection module triggering a request for a reduced transmission symbol rate from the far end transceiver. Consequently, with a reduced transmission symbol rate, improved adjacent channel interference protection is obtained, which is an advantage.

Another advantage obtained by the present transceiver is a less complex design of the transceiver, since the design of, e.g., signal filters, can be made under the assumption of negligible adjacent channel interference.

A further advantage of the disclosed transceiver is that it enables a more dense frequency allocation in the communication network where the transceiver is arranged to be deployed. This is because frequency channel allocation in the network, i.e., the network radio planning, can be made more dense due to the improved resilience to adjacent channel interference of the present transceiver.

Yet another advantage of the disclosed transceiver is an increased average transmission symbol rate in scenarios where requirements on C/I ratio are limiting or dimensioning for the transmission symbol rate. This leads to an increased average link capacity, mainly because regulations on C/I are by the present teaching no longer dimensioning the transmission symbol rate, which can instead be maximized up to the transmission symbol rate allowed by the regulatory frequency mask during normal operating conditions.

According to an aspect the transmit unit comprises a rate control module arranged to control the transmission symbol rate of the transceiver. The processor unit is arranged to respond to a received request for reduced transmission symbol rate, said request being received via the received first signal from the far end transceiver, by reducing, by the rate control module, the transmission symbol rate of the transceiver by a pre-configured amount.

Consequently the advantageous effect of reducing impact of adjacent channel interference at the far end transceiver is obtained by the reduction of transmission symbol rate by the rate control module.

According to another aspect the interference detection module is further arranged to determine a carrier-to-interference, C/I, ratio by determining the power, C, of the received first signal on the receive port, and also determining the power, I, of an interference received on the receive port. The interference detection module is arranged to detect the presence of interference in the received first signal by comparing the determined C/I ratio to a pre-configured C/I threshold and to declare detection of interference in the received first signal based on if the determined C/I ratio is below the pre-configured C/I threshold.

Consequently, an advantageous feature of the disclosed transceiver is the ability of quantifying the amount of interference present by determining the C/I level, and not declaring detection of interference until a significantly low C/I has been determined. Consequently a reduced transmission symbol rate is not requested until an interferer is actually present and is generating significant interference, which interference is jeopardizing the availability and BER performance of the fixed point-to-point radio link.

According to yet another aspect the interference detection module is arranged to determine if one out of the lower sideband or the upper sideband of the first frequency band of the received first signal comprises a stronger interference than the other. The processing module is arranged to request, via the transmitted second signal, a positive frequency offset of the first signal from the far end transceiver when interference is stronger in the lower sideband compared to the upper sideband, and a negative frequency offset of the first signal from the far end transceiver when interference is stronger in the upper sideband compared to the lower sideband.

By the feature of the processing module being arranged to request a frequency offset depending on the location in frequency of the stronger of two interference signals, the signal transmitted in the first frequency band can be shifted in frequency away from the stronger interference signal. Consequently, adjacent channel interference is reduced at the far end transceiver while still maintaining a high transmission symbol rate in scenarios with uneven interference. This is an advantage since improved interference protection is provided with a smaller reduction in transmission symbol rate.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The transceiver, radio link, and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
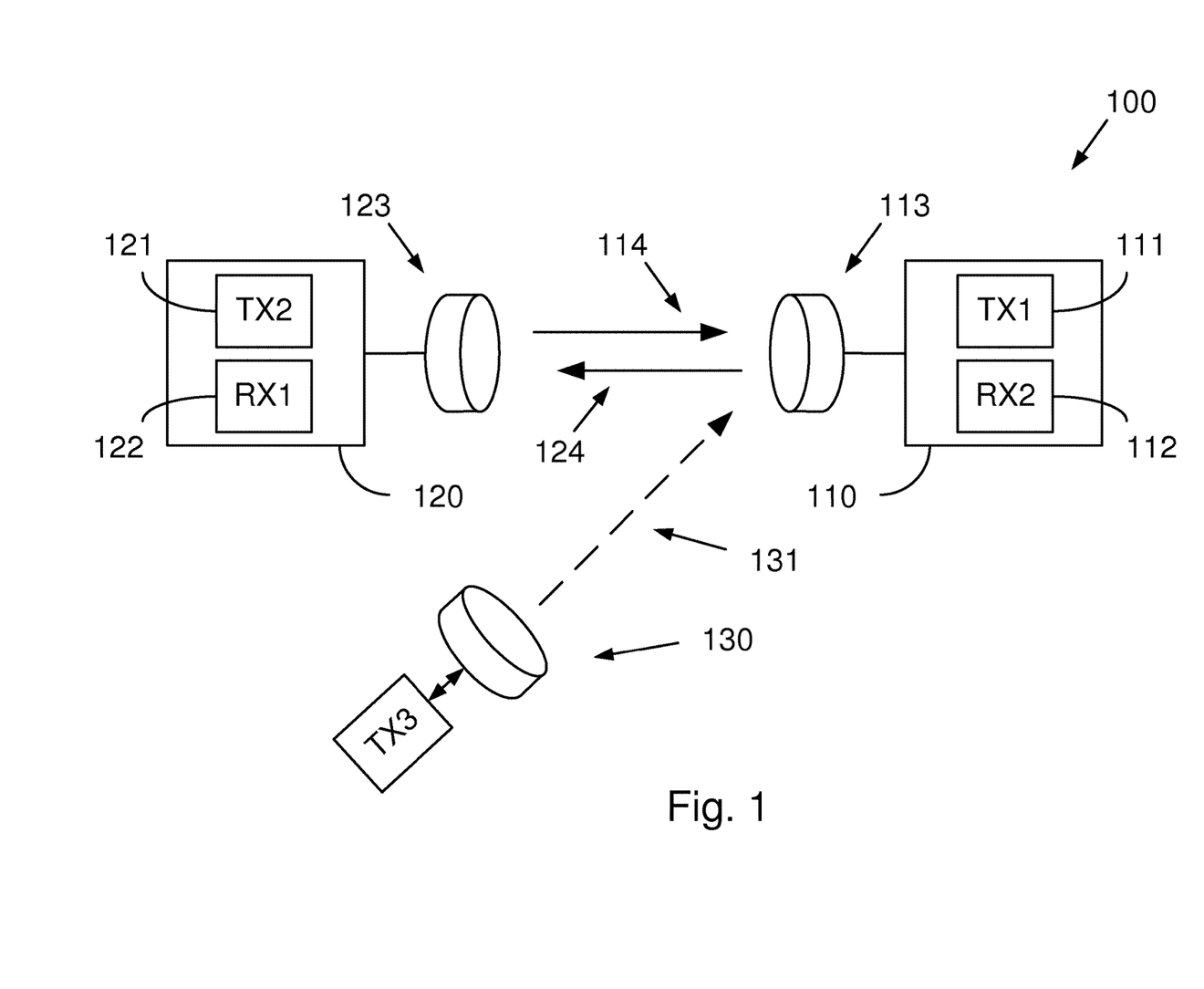
FIG. 1 is a block diagram illustrating an embodiment of a fixed point-to-point radio link.

FIG. 1 is a block diagram illustrating embodiments of a fixed point-to-point radio link 100. In The radio link 100 comprises two transceivers 110, 120, arranged for radio signaling of a first 114 and a second 124 signal, between transceivers 110, 120 using directive antennas 113, 123. Herein, the leftmost transceiver 120 will be referred to as the far end transceiver.

Each of the transceivers 110, 120, comprises a transmitter 111, 121 and a receiver 112, 122. The transceivers 110, 120 are arranged to communicate with each other using modulated information symbols carried by said radio signaling 114, 124. The first 114 and second 124 signal are arranged to be transmitted in a first and a second frequency band, respectively.

A third transmitter 130 is also shown in FIG. 1. This third transmitter 130 is arranged to transmit a third signal 131 primarily in a third frequency band. This signal constitutes interference to the radio link 100, which due to directive antennas primarily affects the rightmost transceiver 110.

It is noted that the first, second, and third frequency bands are not necessarily adjacent in the sense that no fourth frequency band is located between the first and third or between the second and third frequency band. Thus, herein, adjacent channel and adjacent channel interference is to be construed as channels in the frequency vicinity of another channel, and interference generated by transmissions primarily outside of the first or second frequency band.

According to an aspect, the fixed point-to-point radio link 100 is a full duplex radio link, i.e., a radio link where the first and the second frequency band are the same frequency band, and the third transmitter is arranged to transmit in a third frequency band different from the first frequency band and from the second frequency band.

Fixed point to point radio links, such as the one 100 shown in FIG. 1, are often deployed in cellular backhaul networks and other similar networks where requirements on availability and communication bit error rates are very strict. Often, the requirement on availability of a radio link deployed in a network for cellular backhaul is 99.999%, 'five nines', meaning that the radio link cannot be out of operation due to, e.g., rain or multipath fading more than 0.001% of the time counted over the year.

Requirements on data throughput are often also high in connection with limited available bandwidth for this type of communication, resulting in challenging requirements on spectral efficiency of the fixed point-to-point radio link 100.

In general the channel spacing (the frequency distance between channels) is fixed in radio link networks. The C/I performance is characterized mainly by channel bandwidth. An improved C/I performance can be achieved by either lowering the channel bandwidth or by decreasing the order of the modulation. Both of the methods lead to a lowering of spectral efficiency, in terms of bits/sec/Hz, of the system and therefore also a reduction in capacity.

More efficient channel filtering techniques can improve the C/I performance. However, this effect is quite limited since channel filter bandwidth is restricted to the bandwidth of the communication signal. Lowering channel filter bandwidth too far below the channel bandwidth of the transmitted signal will degrade communication system performance severely due to noise amplification and/or inter-symbol interference.

Consider an example of adjacent channel interference where the interference results in an adjacent channel C/I of −2 dB. Reducing the own symbol rate with 10% results in a smaller receiver bandwidth which in turn results in an adjacent channel C/I of −13 dB. So, the improvement is 11 dB which is equivalent of 3 modulations steps. Lowering the symbol rate by 10% enables approximately 3 orders of higher modulation, running an $2^M$ quadrature amplitude modulated, QAM, system, which is more than 30% higher capacity (assuming M=10, i.e., 1024 QAM), so in total the capacity is increased by 20% due to the reduction in transmission symbol rate compared to leaving the symbol rate fixed and just changing the modulation order.

By having an adaptive symbol rate the adjacent channel C/I requirement is not anymore limiting the maximum transmission symbol rate but the only limitation is the transmission frequency mask.

From experiments, it has been shown that improved capacity adjacent channel interference protection will increase the capacity of a fixed point-to-point radio link system in the non-faded case (99.99% or 99.999% of the time) with more than 5%. It will also improve capacity in the faded case significantly if combined with for example adaptive modulation and/or channel coding.

Figure 2:
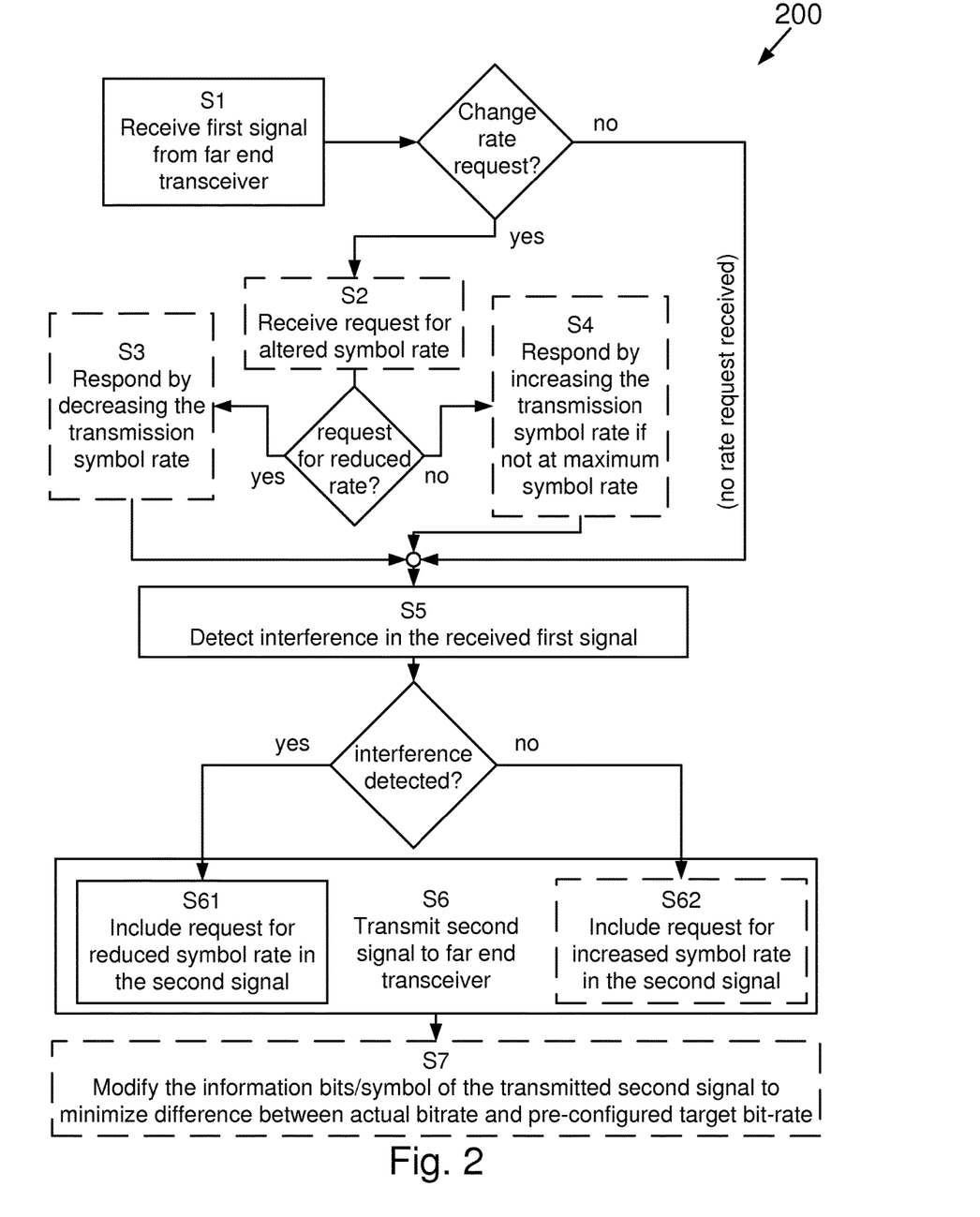
FIGS. 2, 3, 4a, and 4b are flowcharts illustrating embodiments of method steps.

FIG. 2 is a flowchart illustrating embodiments of method steps. In particular, FIG. 2 shows a flowchart of a method 200 in a fixed point-to-point radio link transceiver 110. The method 200 comprises the step of receiving S1 a first signal 114 from a far end transceiver 120 in a first frequency band. The first signal 114 is according to a preferable alternative arranged to be received via a directive antenna 113.

The method 200 also comprises the step of detecting S5 the presence of interference in the received first signal 114. As will be made clear by numerous aspects and alternatives described in detail below, there are multiple alternatives as to how the step of detecting can be executed. The different alternatives varying in complexity and performance.

The method 200 further comprises the step of transmitting S6 a second signal 124 to the far end transceiver 120. The step of transmitting S6 comprises including S61, in the second signal 124, a request to reduce transmission symbol rate in the far end transmitter 120 when interference is detected in the received first signal 114.

According to one aspect, the second signal 124 is a modulated communications signal comprising modulated information symbols, e.g., quadrature amplitude modulated, QAM, information symbols, and the request to reduce transmission symbol rate is included in the second signal 124 by encoding the request over said information symbols or embedding the request in said information symbols.

According to another aspect the second signal 124 is a framed communications signal comprising a header and a payload, and the request to reduce transmission symbol rate is included as information in a header of the second signal 124.

FIG. 2 also shows certain aspects of the method 200. According to one such aspect the method 200 also comprises the step of receiving S2, by the first signal 114, a request for altered transmission symbol rate from the far end transceiver 120.

As for the second signal 124, the first signal 114 is a modulated communications signal comprising modulated information symbols, e.g., quadrature amplitude modulated information symbols, and the request for altered transmission symbol rate is included in the first signal 114 by encoding the request in said information symbols. The first signal 114 is according to an aspect a framed communications signal comprising a header and a payload, and the request for altered transmission symbol rate is included in a header of the first signal 114.

According to an aspect the method 200 further comprises the step of receiving S3 a request for reduced transmission symbol rate from the far end transceiver 120, and responding to the received request for reduced transmission symbol rate by reducing the transmission symbol rate of the transceiver 110 by a pre-configured amount.

According to yet another aspect the method further comprises the step of receiving S4 a request for increased transmission symbol rate from the far end transceiver 120, and responding to the received request for increased transmission symbol rate by increasing the transmission symbol rate of the transceiver 110 by a pre-configured amount, up to a pre-configured maximum transmission symbol rate.

Said pre-configured maximum transmission symbol rate is according to one alternative determined by regulation, i.e., by a transmission spectrum mask. The pre-configured maximum transmission symbol rate is according to one alternative set during installation of the fixed point-to-point radio link. The pre-configured maximum transmission symbol rate is according to another alternative set via a remote configuration procedure of the radio link following deployment of the radio link.

According to an aspect, the step of transmitting S6 further comprises including S62 in the second signal a request to increase transmission symbol rate in the far end transmitter 120 when no interference is detected in the received first signal 114.

FIG. 2 also shows an aspect of the method 200 comprising the step of modifying S7 the number of information bits per modulation symbol in the second signal 124, following a change in transmission symbol rate of the second signal 124, by the amount which minimizes the difference between the actual bit rate of the transmitted second signal 124 and a pre-configured target bit-rate.

The pre-configured target bit rate can according to an aspect be the bit rate of a fixed point-to-point radio link configured for fixed bit rate transmission. This pre-configured rate is then set during deployment of the radio link. Thus, by the feature of minimizing the difference between the actual bit rate of the transmitted second signal and a pre-configured target bit-rate, the advantage of minimizing changes in bit rate due to changes in transmission symbol rate is obtained. This is especially advantageous in fixed point-to-point radio links configured for fixed bit rate transmission where a near-constant bit rate is expected.

Figure 3:
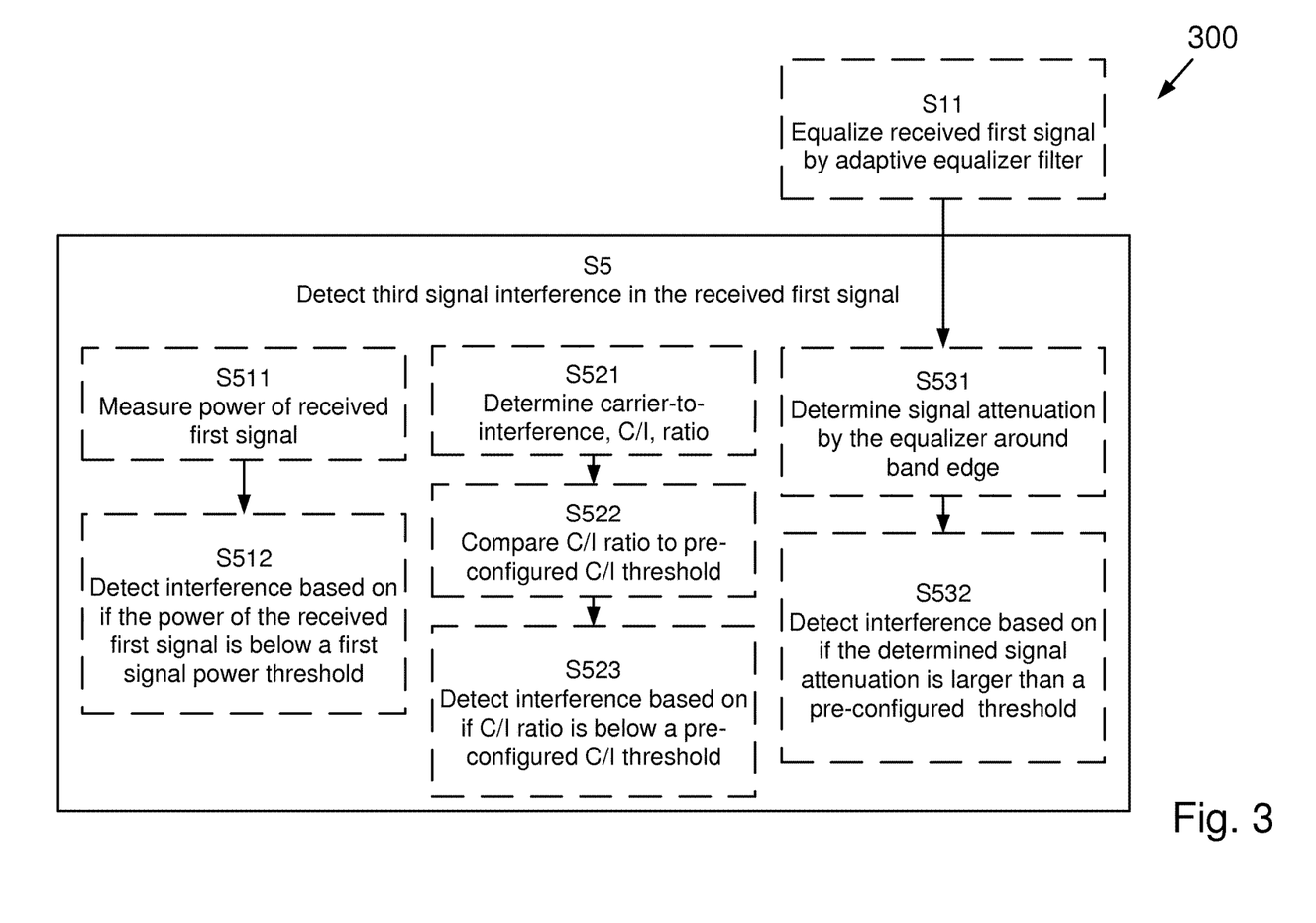

FIG. 3 is a flowchart illustrating embodiments of method steps. In particular, FIG. 3 shows aspects of the step of detecting S5. In particular, according to one such aspect the step of detecting S5 comprises measuring S511 the power of the received first signal 114 and also detecting S512 interference in the received first signal 114 based on if the power of the received first signal 114 is below a pre-configured received first signal power threshold.

The measuring of power can be done by using, e.g., a square-law detector. As noted above this approach to detecting interference can be seen as a worst case detection principle. I.e., one assumes that interference is present at all times, but that this interference cannot degrade performance of the radio link significantly as long as the power of the received first signal 114 is sufficiently high compared to an assumed interference power.

In a preferred implementation the first signal 114 is modulated by QAM symbols, and the pre-configured received first signal power threshold is a pre-determined function of modulation order.

FIG. 3 also shows an aspect of the step of detecting S5 wherein the step of detecting S5 comprises determining S521 a carrier-to-interference, CA ratio by determining the power, C, of the received first signal 114 and also determining the power, I, of the interference 131 originating from the third transmitter 130. The step of detecting S5 also comprises comparing S522 the determined C/I ratio to a pre-configured C/I threshold and detecting S523 interference in the received first signal 114 based on if the determined C/I ratio is below the pre-configured C/I threshold.

A detection error signal is, according to one alternative, generated by comparing detected information symbols comprised in the first signal to received information symbols comprised in the first signal, i.e., the same type of error signal commonly used to update, e.g., adaptive filters like an adaptive equalizer filter.

According to one alternative the presence of adjacent channel interference, and a reduced C/I, is determined by measuring the whiteness, i.e., the spectral flatness, of said error signal, e.g., by determining a fast Fourier transform, FFT, of the error signal and observing whether the FFT is flat in magnitude over frequency or not. A flat spectrum error signal is indicative of a lack of interference, i.e., a high C/I. A non-white, i.e., a non-flat spectrum error signal is indicative of the presence of interference, i.e., a reduced C/I.

In receiver implementations comprising an adaptive equalizer filter configured to equalize the received signal prior to detection, the transfer function of the adaptive equalizer filter should preferably be accounted for when determining the whiteness of the error signal.

Another alternative approach to determining C/I is to apply narrowband filters just outside of the first frequency band, i.e., just outside lower and upper band edges of the first frequency band, in order to determine whether interference is present. The power of the signal filtered out in this way can be used to determine C/I, since it is known how much of the first signal which is present at these frequencies. Hence, if the output from said filters are of higher magnitude or power than expected, then it follows that some other signal is likely present, which signal can be assumed to be an interfering signal.

Yet another alternative approach to determining C/I is to monitor the noise floor of the receiver, under the assumption that an increase in the noise floor of the receiver is an indication of the presence of interference.

It is noted that said alternatives to determining C/I can be used in parallel, and that the step of detecting S5 according to an aspect comprises weighting together several sources of information prior to deciding whether interference is present or not.

According to another aspect of the step of detecting S5, the step of equalizing S11 the received first signal 114 by an adaptive equalizer filter configured to minimize frequency selective fading of the received first signal 114 is comprised. The step of detecting S5 further comprises determining S531 the signal attenuation by the adaptive equalizer filter around a band edge of the first frequency band, and detecting S532 interference in the received first signal 114 based on if the determined signal attenuation by the adaptive equalizer filter around the band edge of the first frequency band is larger than a pre-configured equalizer band edge attenuation threshold.

Thus, the presence of interference is detected by observation of the signal attenuation by an adaptive equalizer filter. The adaptive equalizer filter, being arranged to be updated, e.g., by a least-mean-squares, LMS, algorithm operating on the type of error signal mentioned above, will automatically provide increased attenuation in parts of the first frequency band where interference and noise is strong. Thus, an unevenly biased signal attenuation by the equalizer filter constitutes an indication of the presence of interference, and in particular the presence of adjacent channel interference.

Figure 4A:
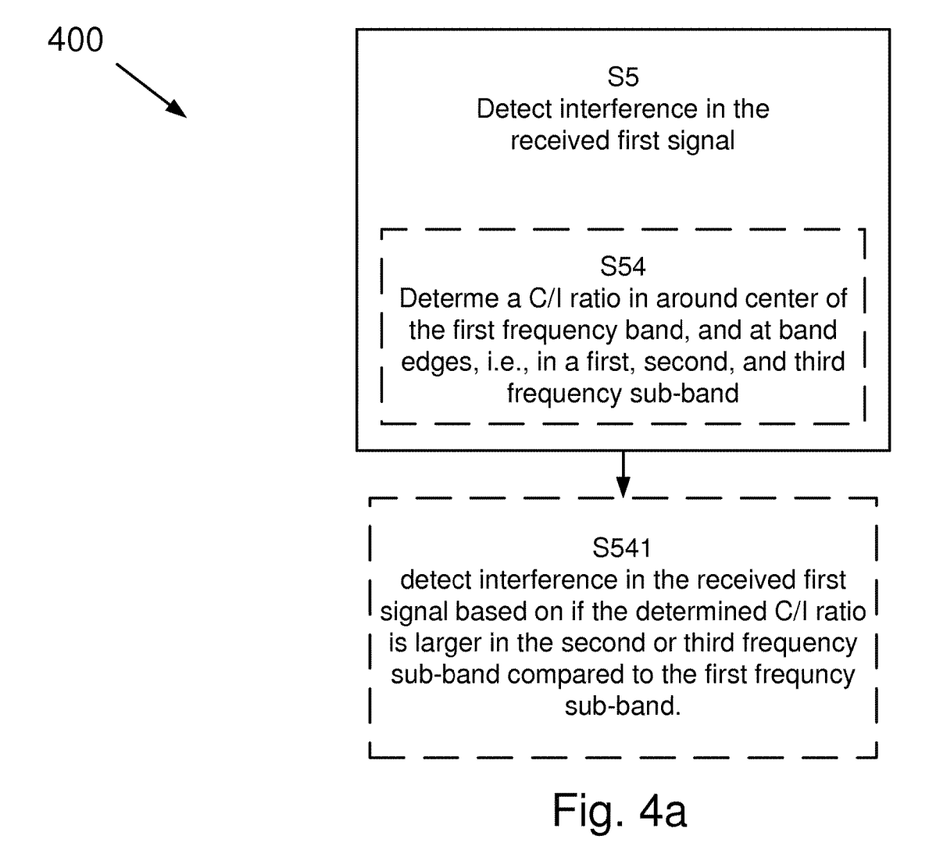

FIG. 4a is a flowchart illustrating embodiments of method steps. In particular, FIG. 4a shows aspects of the step of detecting wherein the first frequency band comprises a first, second, and third frequency sub-band. The first frequency sub-band is located around the center frequency of the first frequency band. The second and third frequency sub-bands are located at lower and upper side-band edges, respectively, of the first frequency band. The step of detecting S5 the presence of interference in the received first signal 114 comprises determining S54 a C/I ratio in the first, and in the second, as well as in the third frequency sub-band, and also detecting S541 interference in the received first signal 114 based on if the determined C/I ratio is larger in the second or third frequency sub-band compared to the first frequency sub-band.

Thus, by determining if the C/I is different in different parts of the first frequency band, the characteristics of the interference is determined. This knowledge is useful for many purposes. For instance, in case interference is equally strong over the first frequency band, the countermeasure of reducing transmission symbol rate will be less effective. Also, as will be discussed below, in case interference is stronger on one side of the first frequency band, it will be advantageous to shift the first signal in frequency in order to move away from the strong interference.

Figure 4B:
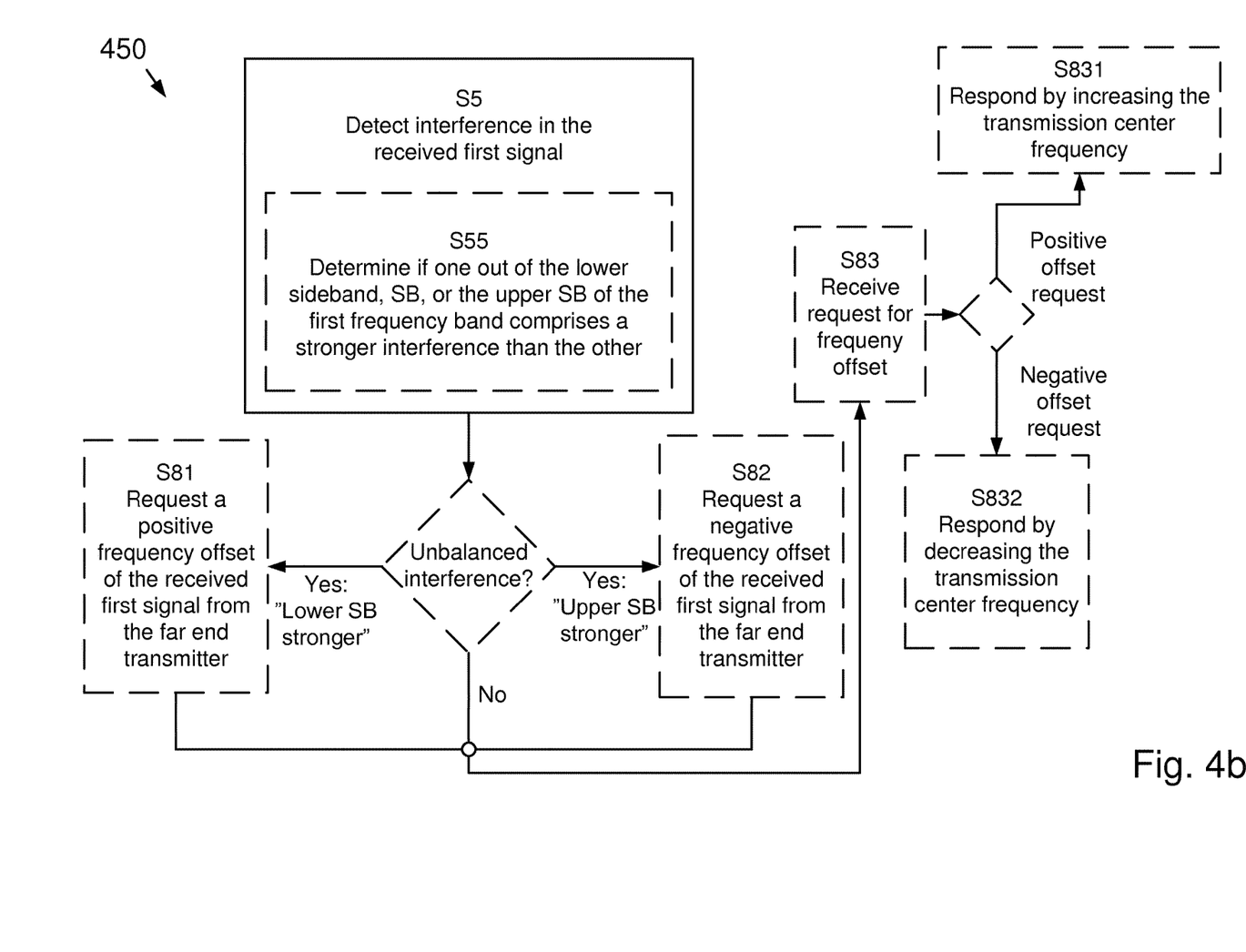

FIG. 4b is a flowchart illustrating embodiments of method steps. In particular, FIG. 4b shows aspects of the method 450, wherein the step of detecting S5 the presence of interference in the received first signal 114 further comprises determining S55 if one out of the lower sideband or the upper sideband of the first frequency band comprises a stronger interference than the other. In particular, the method 450 further comprises the step of requesting S81, via the second signal 124, a positive frequency offset of the first signal from the far end transmitter 120 when interference is stronger in the lower sideband of the first frequency band compared to the upper sideband of the first frequency band.

The method 450 also comprises the step of requesting S82, via the second signal 124, a negative frequency offset of the first signal from the far end transmitter 120 when interference is stronger in the upper sideband of the first frequency band compared to the lower sideband of the first frequency band.

According to one aspect the method 450 further comprises receiving S83 by the first signal 114, a request for frequency offset of the second signal 124 from the far end transceiver (120), and also responding S831 by increasing the transmission center frequency of the transmitted second signal 124 by a pre-defined amount up to a pre-configured maximum frequency offset, when the request is for a positive frequency offset, as well as responding S832 by decreasing the transmission center frequency of the transmitted second signal 124 by a pre-defined amount, down to a pre-configured minimum frequency offset, when the request is for a negative frequency offset.

Thus, not only is the bandwidth of the first signal reduced in order to move away from an interference signal, but the center frequency of the first signal is also shifted in frequency. This means that the frequency spectrum of the first signal 114, 114' is shifted away from the interference, which is advantageous in that the effect of the interference on the received signal is reduced while at the same time maintaining a larger transmission symbol rate, which is possible due to said frequency shift.

In a preferred implementation, the frequency shift of the first signal and the reduction in transmission symbol rate are combined, i.e., applied in parallel.

Figure 5:
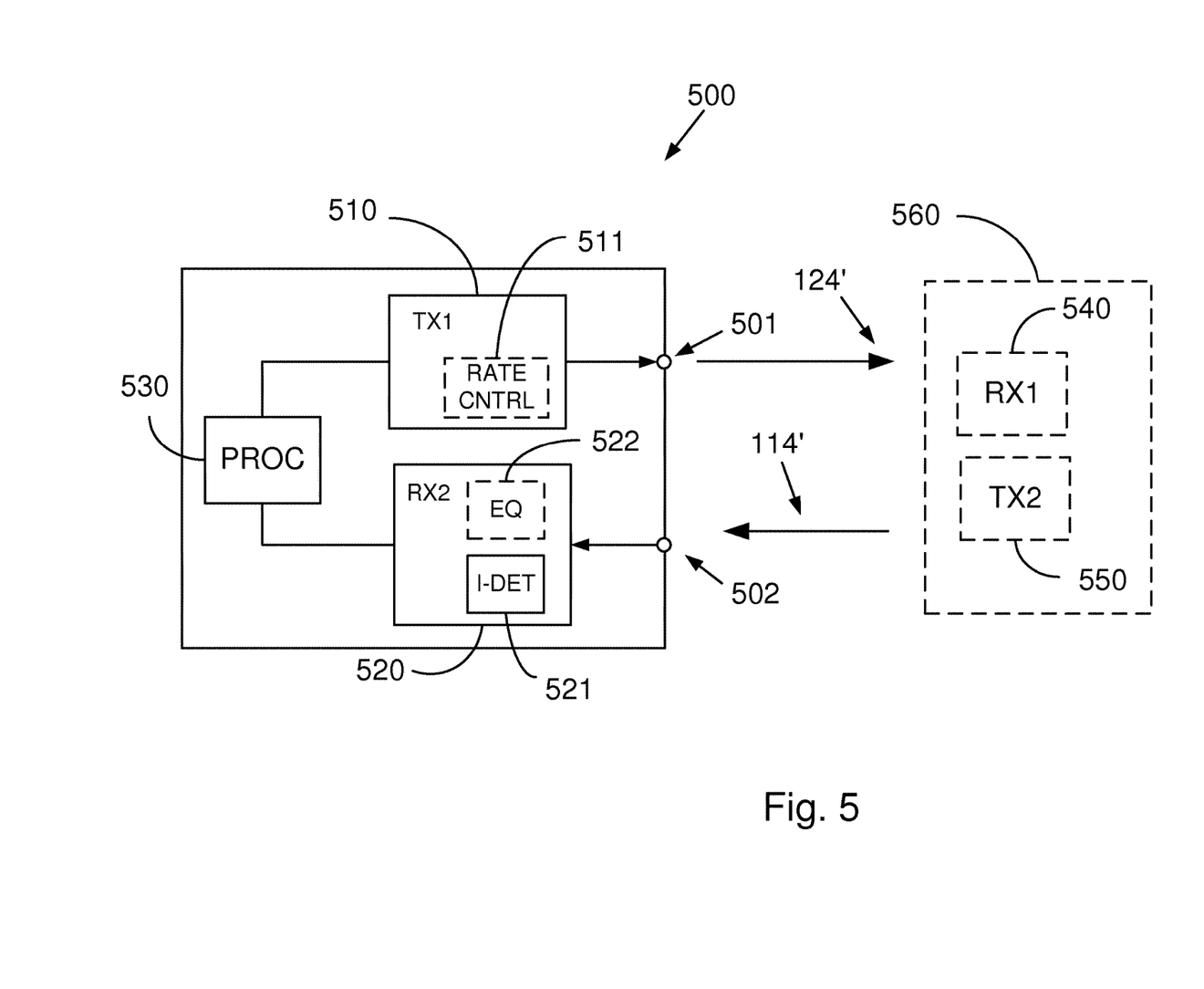
FIG. 5 is a block diagram illustrating embodiments of a fixed point-to-point radio link.

FIG. 5 is a block diagram illustrating embodiments of a fixed point-to-point radio link. FIG. 5 shows a transceiver 500 for a fixed point-to-point radio link. The transceiver 500 comprises a transmit unit 510 arranged to transmit a second signal 124' to a far end transceiver 560 via a transmit port 501. The transceiver 500 also comprises a receive unit 520 arranged to receive a first signal 114' from the far end transceiver 560 via a receive port 502.

The receive unit 520 comprises an interference detection module 521 arranged to detect the presence of interference in the first signal 114'. The transceiver 500 also comprises a processor unit 520 arranged to request, via the transmitted second signal 124', a reduced transmission symbol rate from the far end transceiver 560 when the interference detection module 521 detects the presence of interference in the received first signal 114'.

The features of the interference detection module 521 and the processor unit 520 comprises key components of the present teaching. These features enable a radio link to reduce its transmission symbol rate when the presence of an interference has been detected, thus providing protection from interference by neighboring transmitters. This means that the radio link, and also the network in which the radio link is arranged to be deployed, can be planned for operation assuming a negligible impact from, e.g., adjacent channel interference.

According to one aspect the transmit unit 510 comprises a rate control module 511 arranged to control the transmission symbol rate of the transceiver 500. The processor unit 520 is arranged to respond to a received request for reduced transmission symbol rate, said request being received via the received first signal 114', from the far end transceiver 560 by reducing, by the rate control module 511), the transmission symbol rate of the transceiver 500 by a pre-configured amount.

One example of a rate control module 511 is a digital signal processor, DSP, which controls the transmission symbol rate in the digital domain, e.g., by controlling the rate of a transmission symbol clock comprised in the DSP.

According to yet another aspect, the interference detection module 521 is further arranged to determine a carrier-to-interference, C/I, ratio by determining the power, C, of the received first signal 114' on the receive port 502, and also determining the power, I, of an interference received on the receive port 502. The interference detection module 521 being arranged to detect the presence of interference in the received first signal 114' by comparing the determined C/I ratio to a pre-configured C/I threshold and to declare detection of interference in the received first signal 114' based on if the determined C/I ratio is below the pre-configured C/I threshold.

Several approaches to determining the presence of, and also quantifying the level of, C/I have been disclosed above. According to one alternative the C/I is determined by measuring the whiteness of an error signal. This error signal is generated by comparing detected information symbols comprised in the first signal to received information symbols comprised in the first signal, i.e., the same type of error signal commonly used to update, e.g., adaptive filters like an adaptive equalizer filter. A non-white error signal indicating the presence of interference, and the level of non-whiteness indicates the level of C/I.

It is further emphasized that several approaches to determining the presence of, and also quantifying the level of, C/I can be used in parallel with further improvements in performance.

According to an aspect, the interference detection module 521 is further arranged to determine if one out of the lower sideband or the upper sideband of a first frequency band of the received first signal 114' comprises a stronger interference than the other. The processing module 520 is arranged to request, via the transmitted second signal 124', a positive frequency offset of the first signal 114' from the far end transceiver 560 when interference is stronger in the lower sideband compared to the upper sideband, and a negative frequency offset of the first signal from the far end transceiver 560 when interference is stronger in the upper sideband compared to the lower sideband.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method in a fixed point-to-point radio link transceiver, the method comprising the steps of
receiving a first signal from a far end transceiver in a first frequency band,
detecting the presence of interference in the received first signal, wherein detecting the presence of interference in the received first signal comprises determining if one out of a lower sideband or an upper sideband of the first frequency band comprises a stronger interference than the other,
transmitting a second signal to the far end transceiver, the step of transmitting comprising including, in the second signal, a request to reduce transmission symbol rate in the far end transceiver when interference is detected in the received first signal,
requesting, via the second signal, a positive frequency offset of the first signal from the far end transceiver when interference is stronger in the lower sideband of the first frequency band compared to the upper sideband of the first frequency band, and
requesting, via the second signal, a negative frequency offset of the first signal from the far end transceiver when interference is stronger in the upper sideband of the first frequency band compared to the lower sideband of the first frequency band.

2. The method according to claim 1, wherein said interference comprises interference originating from a third transmitter, the third transmitter using a third frequency band, the third frequency band being separated in frequency from the first frequency band.

3. The method according to claim 2, wherein the step of detecting comprises measuring the power of the received first signal and also detecting interference in the received first signal based on if the power of the received first signal is below a pre-configured received first signal power threshold.

4. The method according to claim 2,
wherein the step of detecting comprises
determining a carrier-to-interference, C/I, ratio by determining the power, C, of the received first signal and also
determining the power, I, of the interference originating from the third transmitter,
the step of detecting further comprising
comparing the determined C/I ratio to a pre-configured C/I threshold and
detecting interference in the received first signal based on if the determined C/I ratio is below the pre-configured C/I threshold.

5. The method according to claim 2,
further comprising the step of equalizing the received first signal by an adaptive equalizer filter configured to minimize frequency selective fading of the received first signal,
the step of detecting further comprising determining the signal attenuation by the adaptive equalizer filter around a band edge of the first frequency band, and detecting interference in the received first signal based on if the determined signal attenuation by the adaptive equalizer filter around the band edge of the first frequency band is larger than a pre-configured equalizer band edge attenuation threshold.

6. The method according to claim 2,
wherein the first frequency band comprises a first, second, and third frequency sub-band, the first frequency sub-band being located around the center frequency of the first frequency band, the second and third frequency sub-bands being located at lower and upper side-band edges, respectively of the first frequency band, and
wherein the step of detecting the presence of interference in the received first signal comprises
determining a C/I ratio in the first, and in the second, as well as in the third frequency sub-band, and also
detecting interference in the received first signal based on if the determined C/I ratio is larger in the second or third frequency sub-band compared to the first frequency sub-band.

7. The method according to claim 1, further comprising the step of receiving, by the first signal, a request for altered transmission symbol rate from the far end transceiver.

8. The method according to claim 7, further comprising the step of
receiving a request for reduced transmission symbol rate from the far end transceiver, and
responding to the received request for reduced transmission symbol rate by reducing the transmission symbol rate of the transceiver by a pre-configured amount.

9. The method according to claim 7, further comprising the step of
receiving a request for increased transmission symbol rate from the far end transceiver, and
responding to the received request for increased transmission symbol rate by increasing the transmission symbol rate of the transceiver by a pre-configured amount, up to a pre-configured maximum transmission symbol rate.

10. The method according to claim 1, the step of transmitting further comprising including in the second signal a request to increase transmission symbol rate in the far end transmitter when no interference is detected in the received first signal.

11. The method according to claim 1, further comprising receiving by the first signal, a request for frequency offset of the second signal from the far end transceiver, and also
responding by increasing the transmission center frequency of the transmitted second signal by a pre-defined amount up to a pre-configured maximum frequency offset, when the request is for a positive frequency offset, as well as
responding by decreasing the transmission center frequency of the transmitted second signal by a pre-defined amount, down to a pre-configured minimum frequency offset, when the request is for a negative frequency offset.

12. The method according to claim 1, further comprising modifying the number of information bits per modulation symbol in the second signal, following a change in transmission symbol rate of the second signal, by the amount which minimizes the difference between the actual bit rate of the transmitted second signal and a pre-configured target bit-rate.

13. A transceiver for a fixed point-to-point radio link, the transceiver comprising
a transmit unit arranged to transmit a second signal to a far end transceiver via a transmit port,
a receive unit arranged to receive a first signal from the far end transceiver via a receive port, the receive unit comprising an interference detection module arranged to detect the presence of interference in the first signal, the interference detection module further being arranged to determine if one out of a lower sideband or an upper sideband of a first frequency band of the received first signal comprises a stronger interference than the other,
a processor unit arranged to request, via the transmitted second signal, a reduced transmission symbol rate from the far end transceiver when the interference detection module detects the presence of interference in the received first signal, and where the processor unit is arranged to request, via the transmitted second signal a positive frequency offset of the first signal from the far end transceiver when interference is stronger in the lower sideband compared to the upper sideband, and a negative frequency offset of the first signal from the far end transceiver when interference is stronger in the upper sideband compared to the lower sideband.

14. The transceiver according to claim 13, wherein
the transmit unit comprises a rate control module arranged to control the transmission symbol rate of the transceiver,
the processor unit being arranged to respond to a received request for reduced transmission symbol rate, said request being received via the received first signal, from the far end transceiver by reducing, by the rate control module, the transmission symbol rate of the transceiver by a pre-configured amount.

15. The transceiver according to claim 13, wherein the interference detection module is further arranged to determine a carrier-to-interference, C/I, ratio by determining the power, C, of the received first signal on the receive port, and also determining the power, I, of an interference received on the receive port, the interference detection module being arranged to detect the presence of interference in the received first signal by comparing the determined C/I ratio to a pre-configured C/I threshold and to declare detection of interference in the received first signal based on if the determined C/I ratio is below the pre-configured C/I threshold.

* * * * *